United States Patent
Sutton et al.

(10) Patent No.: US 9,457,897 B2
(45) Date of Patent: Oct. 4, 2016

(54) ROTOR SYSTEM SHEAR BEARING

(71) Applicant: Bell Helicopter Textron Inc., Fort Worth, TX (US)

(72) Inventors: Drew Sutton, Watauga, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 748 days.

(21) Appl. No.: 13/778,803

(22) Filed: Feb. 27, 2013

(65) Prior Publication Data
US 2014/0241886 A1    Aug. 28, 2014

(51) Int. Cl.
*B64C 27/48* (2006.01)
*B64C 27/33* (2006.01)
*B64C 27/35* (2006.01)

(52) U.S. Cl.
CPC .............. *B64C 27/48* (2013.01); *B64C 27/33* (2013.01); *B64C 27/35* (2013.01)

(58) Field of Classification Search
CPC ........ B64C 27/35; B64C 27/48; B64C 27/51
See application file for complete search history.

(56) References Cited

U.S. PATENT DOCUMENTS

| | | | |
|---|---|---|---|
| 3,874,815 A | 4/1975 | Baskin | |
| 4,093,400 A | 6/1978 | Rybicki | |
| RE30,713 E | 8/1981 | Ferris et al. | |
| 6,113,352 A | 9/2000 | Certain et al. | |
| 7,677,584 B2 * | 3/2010 | Raley | B60R 3/02 182/127 |
| 2011/0274548 A1 | 11/2011 | Stamps et al. | |

OTHER PUBLICATIONS

Extended European Search Report issued in European Application No. 13165399.0 on Nov. 24, 2014; 7 pages.

* cited by examiner

*Primary Examiner* — Mary A Davis
(74) *Attorney, Agent, or Firm* — Fish & Richardson P.C.

(57) ABSTRACT

A shear bearing for a rotor system has a four bar linkage and a grip configured to retain a flexural yoke and the grip is connected between a first set of opposing links of the four bar linkage. A rotor system has a flexural yoke and a shear bearing configured to perform at least one of transmitting forces to the yoke and receiving forces from the yoke, wherein the yoke is free of cavities for receiving the shear bearing. A rotational system has a flexural yoke and a damper disposed on a surface of the yoke.

21 Claims, 4 Drawing Sheets

ROTOR SYSTEM SHEAR BEARING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rotor systems, such as, but not limited to, rotor systems for helicopters, may comprise a flexural yoke that supports rotor blades. In some cases, the transmission of torsional forces (pitching loads) or (feathering loads) generally about a spanwise axis of the rotor blade may be accomplished by coupling a vertical shear bearing between the flexural yoke and the pitch links connected to a rotating control system. With a vertical shear being offset from the spanwise (pitching axis) either to the leading or training edge, vertical shear may flap the rotor blade about a flapping axis if not reacted out through a vertical shear bearing. In some cases, locating the vertical shear bearing in a kinematically suitable position may require providing an aperture in the flexural yoke and disposing at least a portion of the shear bearing in the aperture to accommodate vertical shear and/or in-plane shears from chord loads.

SUMMARY

In some embodiments of the disclosure, a rotor system is disclosed as comprising a flexural yoke and a shear bearing configured to perform at least one of transmitting forces to the yoke and receiving forces from the yoke, wherein the yoke is free of cavities for receiving the shear bearing.

In other embodiments of the disclosure, a shear bearing for a rotor system is disclosed as comprising a four bar linkage and a grip configured to retain a flexural yoke, the grip being connected between a first set of opposing links of the four bar linkage.

In yet other embodiments of the disclosure, a rotational system is disclosed as comprising a flexural yoke and a damper disposed on a surface of the yoke.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to couple a rotor blade, such as, but not limited to, a helicopter rotor blade, to a flexural yoke without providing an aperture and/or cavity in the flexural yoke to accommodate a vertical shear bearing. In some embodiments of the disclosure, systems and methods are disclosed that comprise providing a flexural yoke that is free of apertures and/or cavities configured to receive any portion of a vertical shear bearing. In some embodiments, a vertical shear bearing is provided that may be attached to an exterior of a flexural yoke and/or a component substantially rigidly attached to a flexural yoke. In some embodiments, the vertical shear bearing may comprise a four bar linkage configured to transmit torsional forces about a spanwise axis of a rotor blade between the flexural yoke and one or more of a pitch horn and a rotor blade. In some embodiments, unlike the yoke 121 of FIG. 2 of U.S. Pat. No. 8,231,346 B2 issued to Stamps et al. on Jul. 31, 2012, the vertical shear bearing of this disclosure may be connected to a yoke generally at outer sides of yoke arms instead of being disposed and/or connected to a yoke at an aperture of the yoke. In some cases, the above-described external connection between a vertical shear bearing of this disclosure and a yoke of this disclosure may allow load bearing fibers of a composite yoke to extend between opposing yoke arms via a shorter path, a straighter path, and/or a path that does not deviate to accommodate an aperture for a vertical shear bearing.

Figure 1:
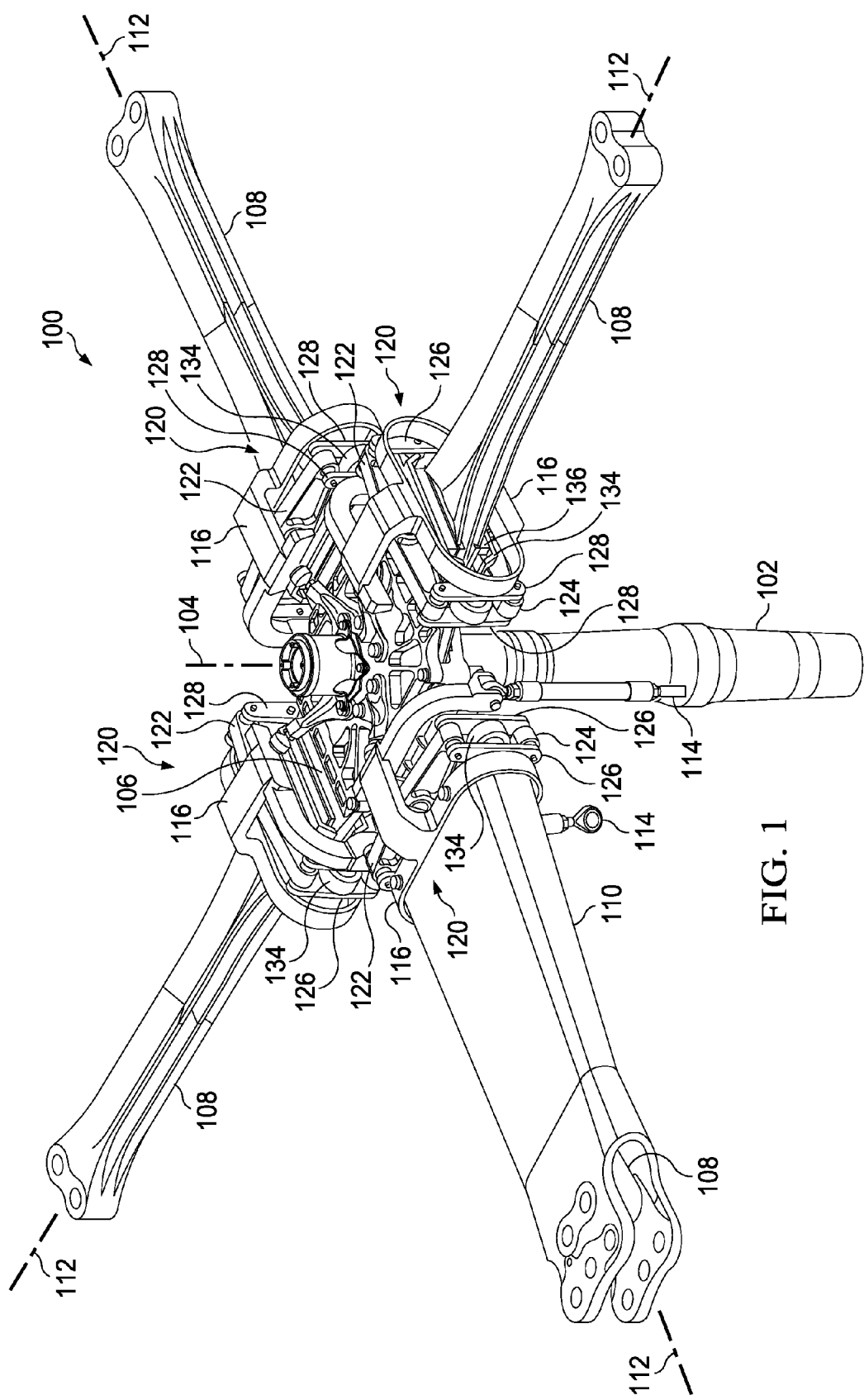
FIG. 1 is an oblique top view of a rotor system according to an embodiment of the disclosure.
Figure 2:
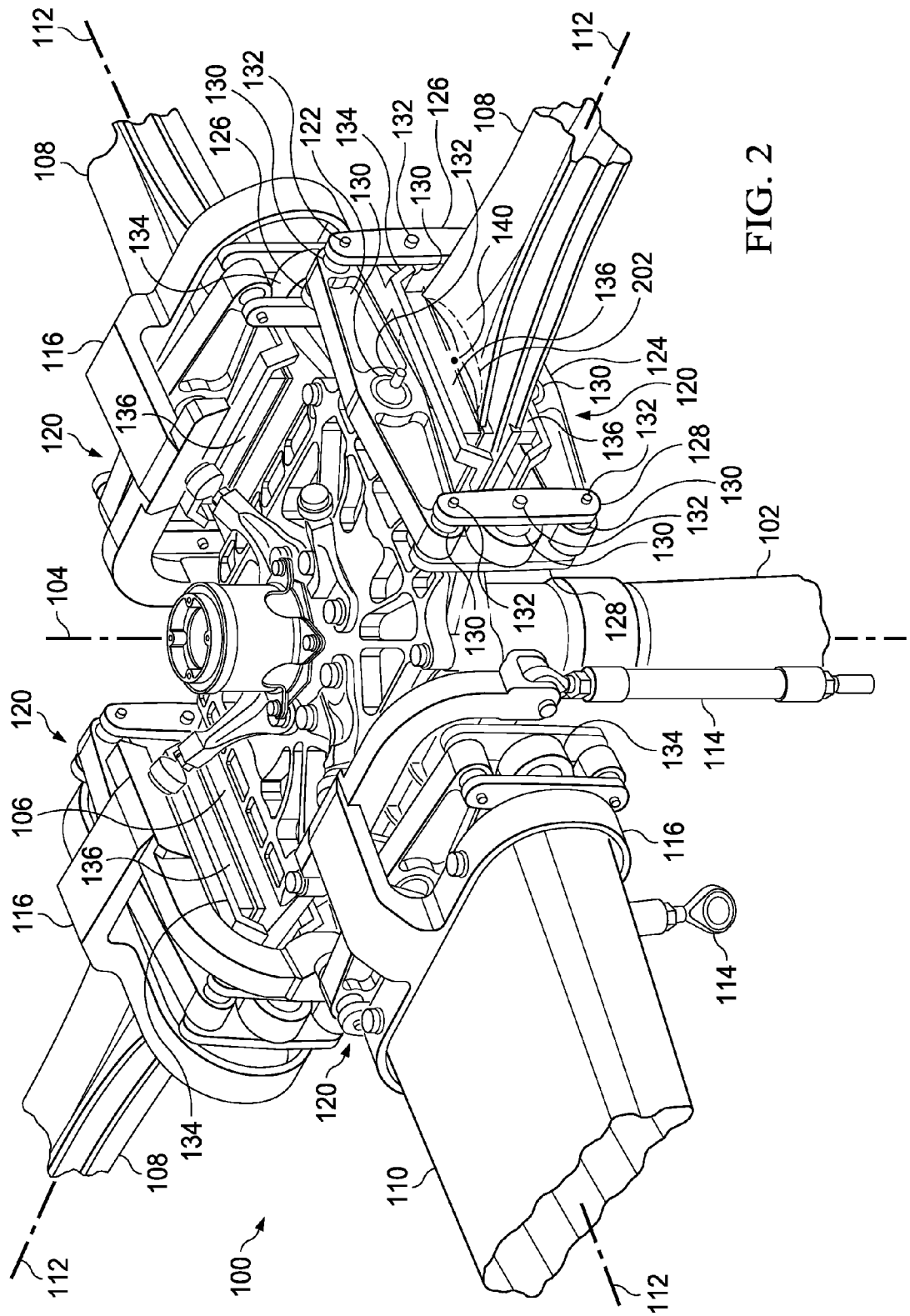
FIG. 2 is an oblique close-up view of a portion of the rotor system of FIG. 1.
Figure 3:
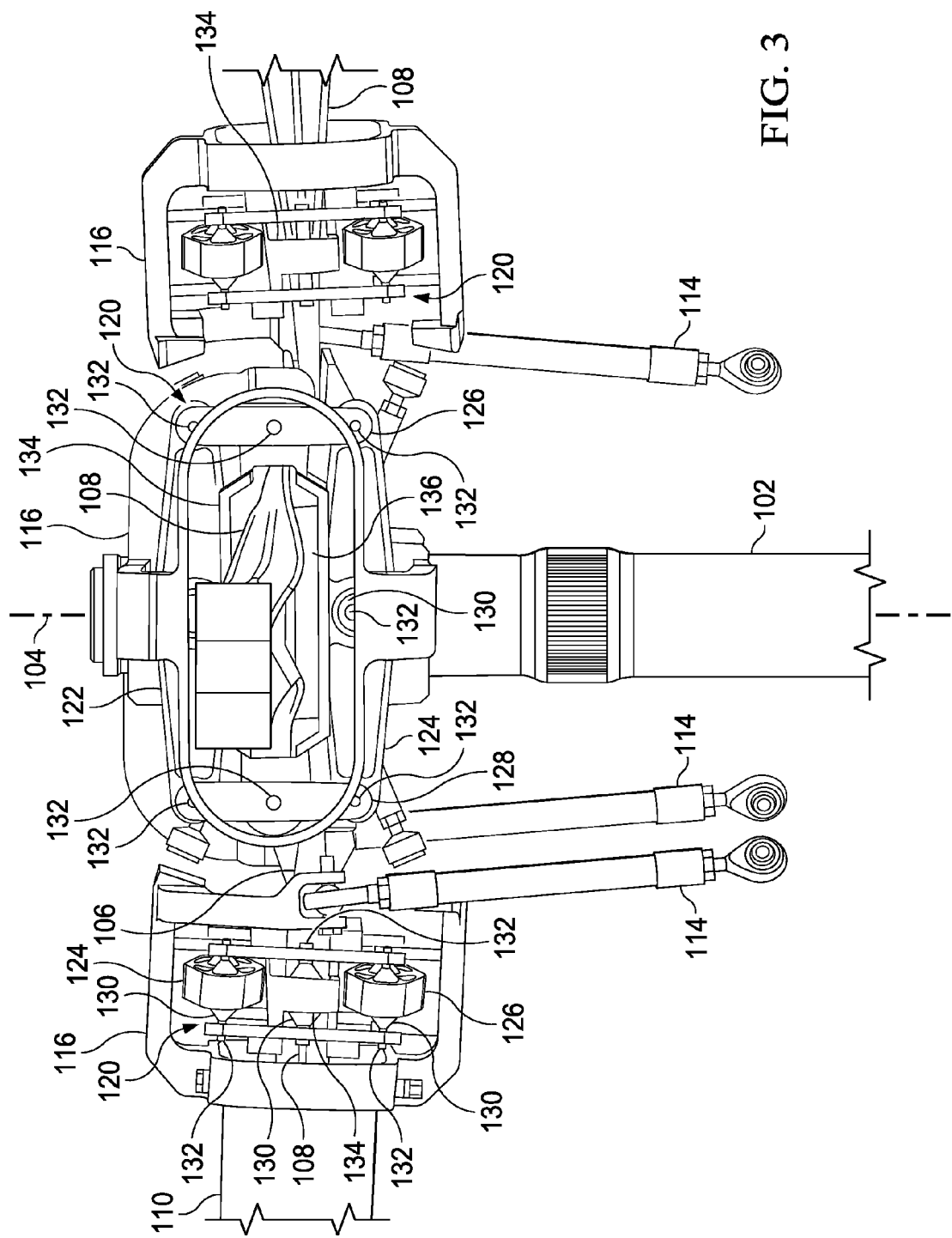
FIG. 3 is a substantially orthogonal side view of a portion of the rotor system of FIG. 1.

Referring now to FIGS. 1-3, an oblique top view of a rotor system 100, a close-up oblique top view of a portion of the rotor system 100, and a substantially orthogonal side view of a portion of the rotor system 100 are shown, respectively. Rotor system 100 generally comprises a mast 102 that may rotate about a mast axis of rotation 104. The rotor system 100 may further comprise a flexural yoke 106 comprising a plurality of arms 108. The flexural yoke 106 may comprise composite laminate materials and/or metal. In this embodiment, each yoke 106 comprises two arms 108 that are each generally configured for connection to a rotor blade and/or airfoil. In this embodiment, two yokes 106 are vertically stacked and angularly offset relative to each other to create the four-arm configuration shown. In some embodiments, the arms 108 may be substantially enveloped by associated cuffs 110. In some embodiments, each arm 108 may be associated with a spanwise axis 112. In some cases, the spanwise axis 112 may be referred to as a pitch axis and/or a feathering axis about which the arms 108, cuffs 110, and/or rotor blades may rotate and/or twist in response to environmental, operational, and/or control perturbations. In some embodiments, a pitch change about this spanwise axis 112 of the cuffs 110 and/or rotor blades may be adjusted by vertically translating a pitch link 114 that is pivotally linked to a pitch horn 116 attached to the cuff 110.

The rotor system 100 may further comprise a shear bearing 120 that may generally comprise a four bar linkage connected to each of an arm 108 and an associated cuff 110. In some embodiments, the shear bearing 120 may comprise an upper link 122, a lower link 124, two forward links 126, and two rear links 128. A plurality of bearings 130 may be utilized in concert with pins 132 for joining the components of the four bar linkage. In some embodiments, the bearings 130 may comprise elastomeric components configured to return the system to a neutral pitch. In some embodiments, the upper link 122 and the lower link 124 may be pinned to the pitch horn 116 and the pitch horn 116 may be attached to and/or substantially carry the cuff 110. The shear bearing 120 may further comprise a grip 134 connected between the forward links 126 and the rear links 128 utilizing bearings 130 and pins 132. The grip 134 may generally extend around the arm 108 and may be sufficiently rigid to snugly retain damper pads 136 between the grip 134 and the arm 108 on both an upper side of the arm 108 and a lower side of the arm 108. The above-described mechanical linkages of the shear bearing 120 may be configured to primarily transmit rotational forces about the spanwise axis 112 between the arms 108 of the flexural yoke 106 and the pitch horn 116. In alternative embodiments, the shear bearing 120 may additionally and/or alternatively be connected directly to the cuff 110 and/or pitch link 114.

In operation, the rotor system 100 may rotate the flexure yoke 106 and the related components about the mast axis of rotation 104. In some cases, a rotational force about the spanwise axis 112 that may tend to change a pitch of the rotor blade and/or cause feathering of the rotor blade may be imparted to at least one of the rotor blade associated with an arm 108, the cuff 110 associated with the arm 108, and/or the pitch horn 116 associated with the arm 108. The rotational force applied to the rotor blade and/or the cuff 110 may be a result of air loads generated in flight or other environmental condition while the rotational force applied to the pitch horn 116 may be the result of a control input to the rotor system 100 via the pitch link 114. Regardless the source of the pitching and/or feathering movement and/or related forces, the shear bearing 120 may be configured to transfer and/or partially absorb the movement and/or energy related to the forces. Particularly, the shear bearing 120 may be configured to receive rotational inputs about the spanwise axis 112, alter a position of the four bar linkage of the shear bearing 120, and resultantly transmit rotational movement and/or forces to the arm 108 via the grip 134 and associated damper pads 136. The kinematic behavior of the four bar linkage of the shear bearing 120 may be described as converting rotational inputs from the pitch horn 116 into relative translational movements of the upper and lower links 122, 124 relative to the grip 134.

Figure 4:
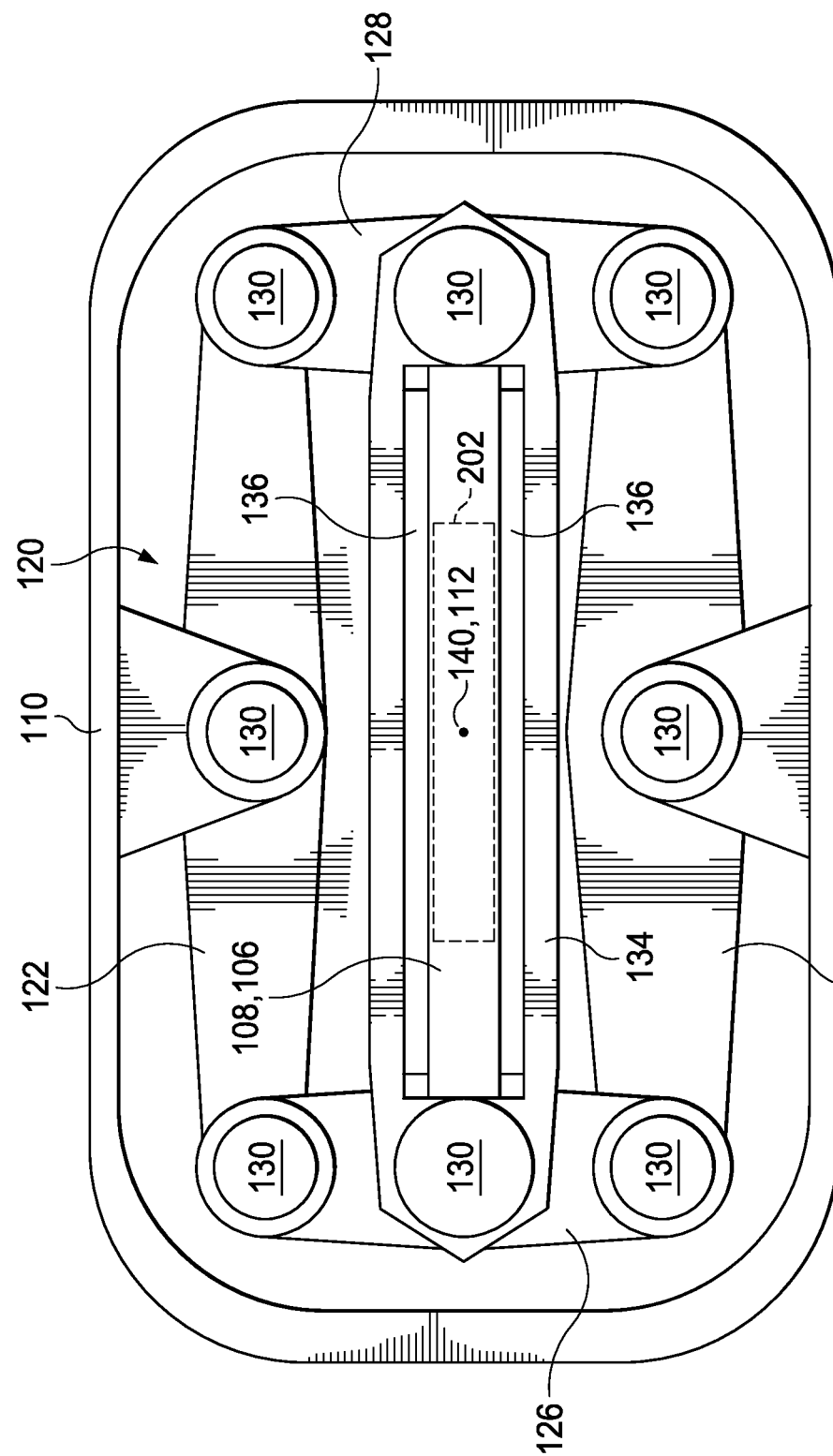
FIG. 4 is schematic cut-away view of a shear bearing of the rotor system of FIG. 1.

Referring now to FIG. 4, a schematic cut-away view of the shear bearing 120 is as viewed from a relatively inboard location and looking generally radially outward along the spanwise axis 112. As a function of the grip 134 being pinned between the forward and rear links 126, 128 of the four bar linkage, the above-described relative translational movements are effectively converted from the translational movements to a rotational movement of the arm 108 about a center of rotation 140 of the shear bearing 120. In some embodiments, the center of rotation 140 may be positioned substantially coincident with the spanwise axis 112. In some cases, the center of rotation 140 may also be a point about which the four bar linkage of the shear bearing 120 cocks or otherwise is racked out of plane as a function of one or more of the bearings 130 accommodating spherical and/or orbiting movement between interconnected links of the four bar linkage. In some cases, one or more of the bearings 130 may be configured as a spherical bearing while other bearings 130 are configured to substantially limit movement to rotation about the pins 132. In some cases, an elasticity and/or spring rating of the bearings 130 may be relatively high as compared to other components of the shear bearing. More specifically, the bearings 130 may be selected to have spring rates that do not substantially interfere with an effectiveness of the damper pads 136 and/or any other primary damping component. In some cases, providing the damper pads 136 directly on the arm 108 may provide a more consistent damping functionality that is substantially independent of any flapping and/or pitching of the arm 108. In some cases, the utilization of the damper pads 136 in the manner described above may negate a need for a separate fluid damper in the rotor system 100.

Further, FIG. 4 shows that the shear bearing 120 may require no centrally located aperture, cavity, and/or recess in the flexural yoke 106 for the purpose of accommodating a shear bearing within the aperture, cavity, and/or recess because the accommodation of vertical shear in the rotor system 100 is achieved by applying forces to the outside and/or continuous upper and/or lower surfaces of the flexural yoke 106. Particularly, the systems and methods disclosed may prevent the need for a through hole or aperture in a yoke such as hole 202 of FIG. 2 that may otherwise be provided to accommodate a typical shear bearing that may comprise a center of rotation located substantially similarly as the center of rotation 140. As such, the rotor system 100 may comprise a flexural yoke comprising only holes for accommodating passage of a mast therethrough and/or for accepting bolts and/or other fasteners associated with securing the flexural yoke 106 to the mast 102. In some cases, providing a flexural yoke 106 that comprises a composite layup of materials may significantly strengthen the yoke 106 in tension along a load bearing continuous fiber that extends between opposing yoke arms 108, decrease an overall mass, decrease an overall radial footprint, and/or otherwise improve a performance characteristic of the flexural yoke 106.

While the shear bearing 120 and associated components and configurations are described above in the context of a rotor system 100 for a helicopter, the shear bearing 120 and the rotor system 100 may be applied to any other suitable rotor related application. In some case, a fixed wing aircraft in which a pitch of a propeller may be adjusted (e.g. constant speed propeller systems) may utilize a rotor system 100. Similarly, any other craft or device that may selectively control a pitch and/or feathering of a rotor blade may benefit from utilization of the shear bearing 120 and/or rotor system 100.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system, comprising:
    a rotor system comprising:
        a flexural yoke; and
        a shear bearing configured to perform at least one of transmitting forces to the flexural yoke and receiving forces from the flexural yoke, wherein the shear bearing comprises:
            a four bar linkage comprising a first set of opposing links including a forward link and a rear link and a second set of opposing links including an upper link and a lower link, the forward link being connected to the upper link with a first pin and to the lower link with a second pin, the rear link being connected to the upper link with a third pin and to the lower link with a fourth pin, the forward link being rotatable about the first pin and the second pin, the rear link being rotatable about the third pin and the fourth pin, the upper link being rotatable about the first pin and the third pin, and the lower link being rotatable about the second pin and the fourth pin; and
            a grip connected between the first set of opposing links of the four bar linkage, wherein the grip retains the flexural yoke.

2. The system of claim 1, wherein the flexural yoke comprises a composite yoke.

3. The system of claim 1, wherein the only apertures in the flexural yoke are configured for performing at least one of accepting a mast therethrough and fastening the flexural yoke to the mast.

4. The system of claim 1, wherein the shear bearing comprises a damper pad between the grip and the flexural yoke.

5. The system of claim 1, wherein the shear bearing comprises an elastomeric bearing at one or more of the first pin, second pin, third pin, or fourth pin, the elastomeric bearing configured to bias the four bar linkage to return to a neutral pitch.

6. The system of claim 5, wherein the elastomeric bearing is comprises a spherical bearing.

7. The system of claim 1, wherein the shear bearing is connected to the flexural yoke at outer sides of the flexural yoke without an aperture through the flexural yoke.

8. The system of claim 1, wherein the shear bearing is connected to a pitch horn.

9. The system of claim 8, wherein the upper link rotatably connects to the pitch horn with an upper pitch horn pin, the lower link rotatably connects to the pitch horn with a lower pitch horn pin, and the four bar linkage is configured to convert rotational inputs from the pitch horn into translational movements of the upper link and the lower link relative to the grip.

10. The system of claim 1, wherein the four bar linkage is configured as a parallelogram four bar mechanism, wherein the first set of opposing links are disposed adjacent to lateral sides of the flexural yoke, and wherein the second set of opposing links are disposed adjacent to upper and lower surfaces of the flexural yoke.

11. The system of claim 1, wherein the grip extends around the flexural yoke to retain the flexural yoke, the grip being rotatably connected to the first set of opposing links by grip pins.

12. The system of claim 1, wherein the shear bearing connects to a cuff that substantially envelops the flexural yoke, and wherein the upper link and the lower link rotatably connect to the cuff with an upper cuff pin and a lower cuff pin.

13. The system of claim 1, wherein the flexural yoke is free of cavities for retention of the flexural yoke by the shear bearing.

14. The system of claim 1, wherein a center of rotation of the shear bearing is substantially coincident with a spanwise axis of the yoke.

15. A system, comprising:
    a shear bearing for a rotor system, the shear bearing comprising:
        a four bar linkage comprising a first set of opposing links including a forward link and a rear link and a second set of opposing links including an upper link and a lower link, the forward link being connected to the upper link with a first pin and to the lower link with a second pin, the rear link being connected to the upper link with a third pin and to the lower link with a fourth pin, the forward link being rotatable about the first pin and the second pin, the rear link being rotatable about the third pin and the fourth pin, the upper link being rotatable about the first pin and the third pin, and the lower link being rotatable about the second pin and the fourth pin; and
        a grip retaining a flexural yoke and connected between the first set of opposing links of the four bar linkage.

16. The system of claim 15, wherein the four bar linkage comprises bearings at the locations of the first pin, the second pin, the third pin, and the fourth pin.

17. The system of claim 16, wherein at least one of the bearings comprises a spherical bearing.

18. The system of claim 15, further comprising a damper pad attached to the grip between the grip and the flexural yoke.

19. The system of claim 15, wherein the four bar linkage is configured for transmitting forces between the flexural yoke and a pitch horn.

20. The system of claim 19, wherein the upper link and the lower link are configured to rotatably attach to the pitch horn via pitch horn pins.

21. The system of claim 15, wherein the grip extends around the flexural yoke to retain the flexural yoke, the grip being rotatably connected to the first set of opposing links by grip pins.

* * * * *